F. B. COOK.
PROCESS OF MOUNTING OBJECTS.
APPLICATION FILED JUNE 19, 1914. RENEWED JUNE 18, 1915.
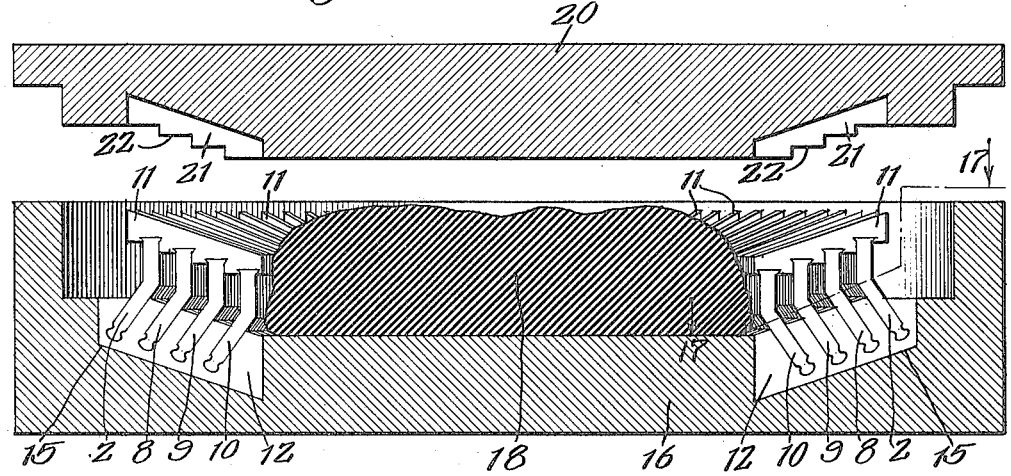
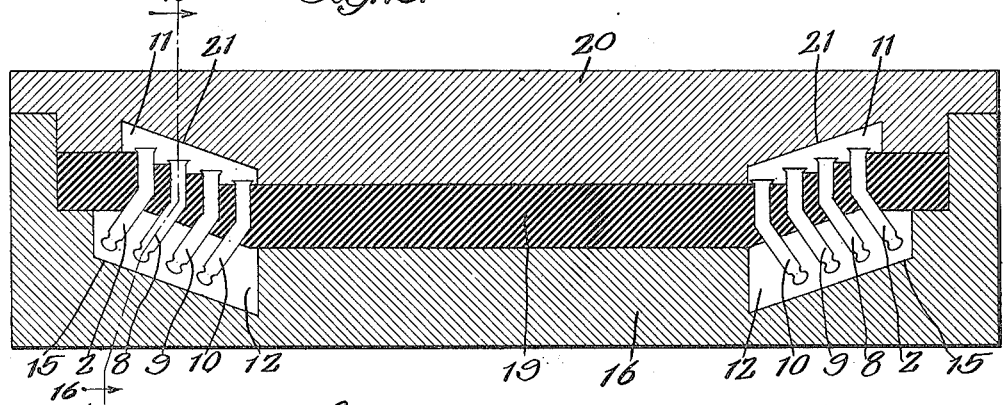
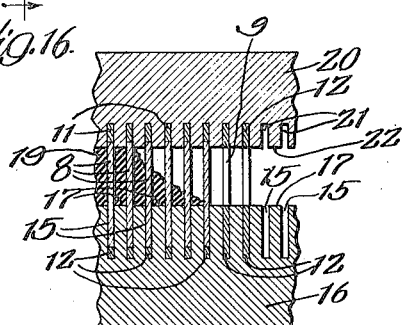
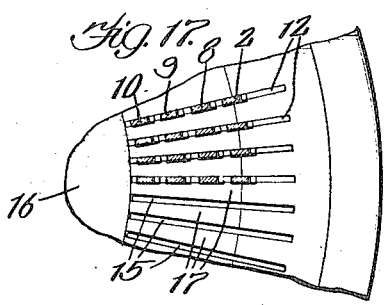

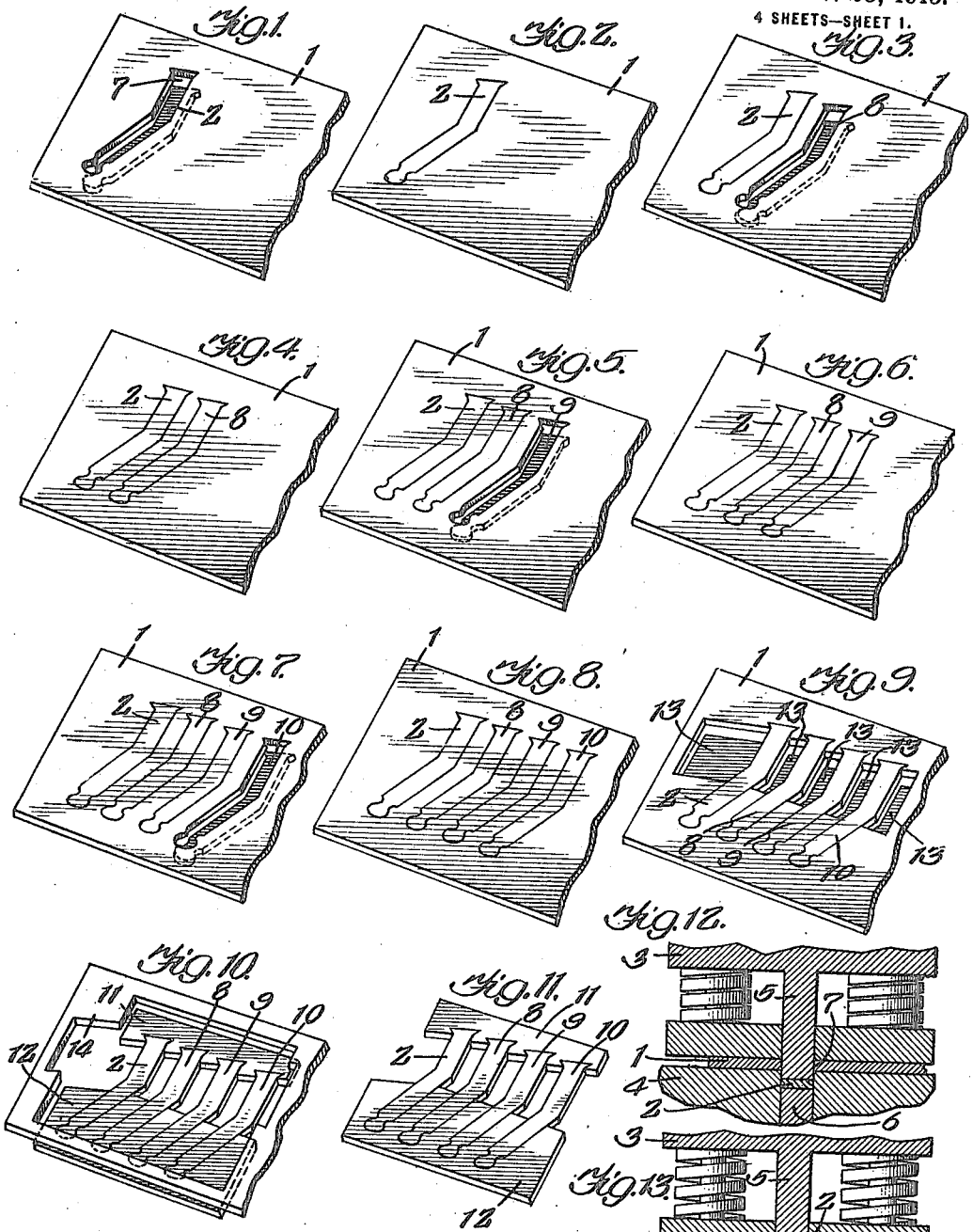

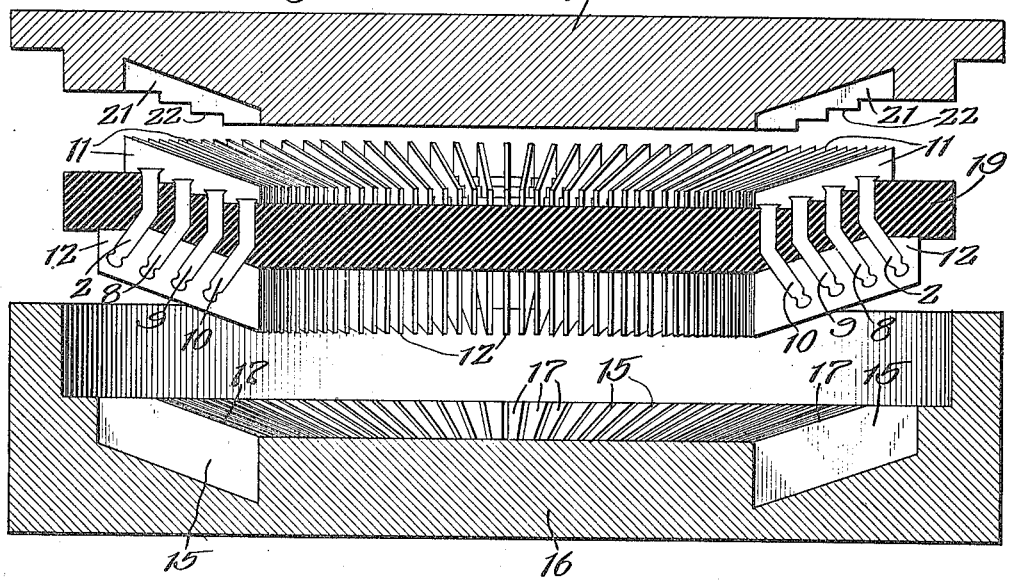
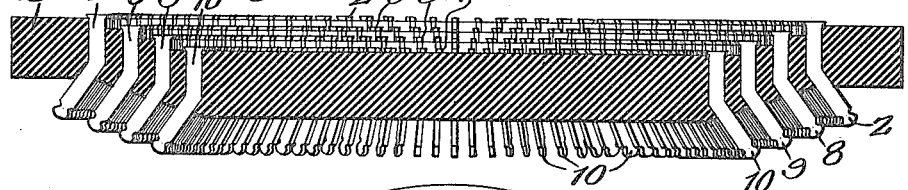
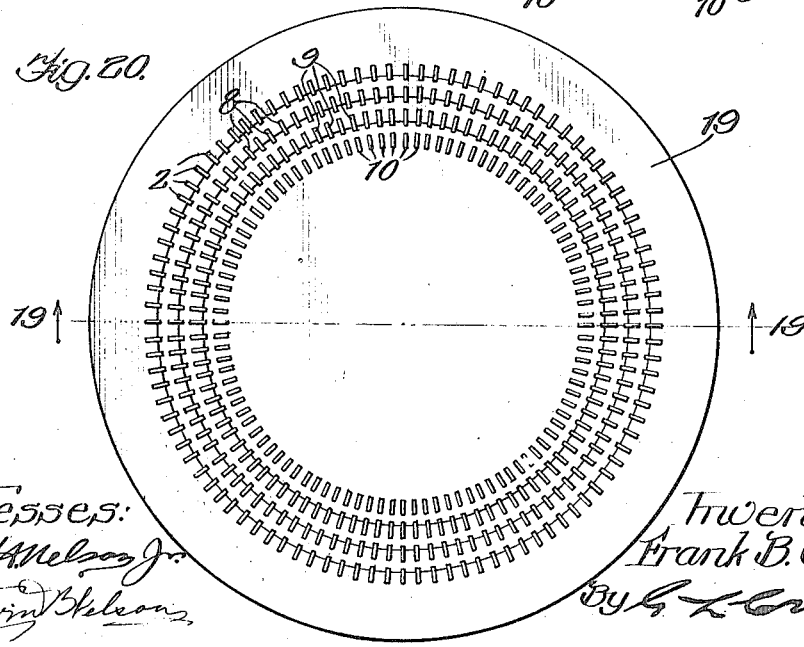

F. B. COOK.
PROCESS OF MOUNTING OBJECTS.
APPLICATION FILED JUNE 19, 1914. RENEWED JUNE 18, 1915.
1,161,191.
Patented Nov. 23, 1915.
4 SHEETS—SHEET 4.
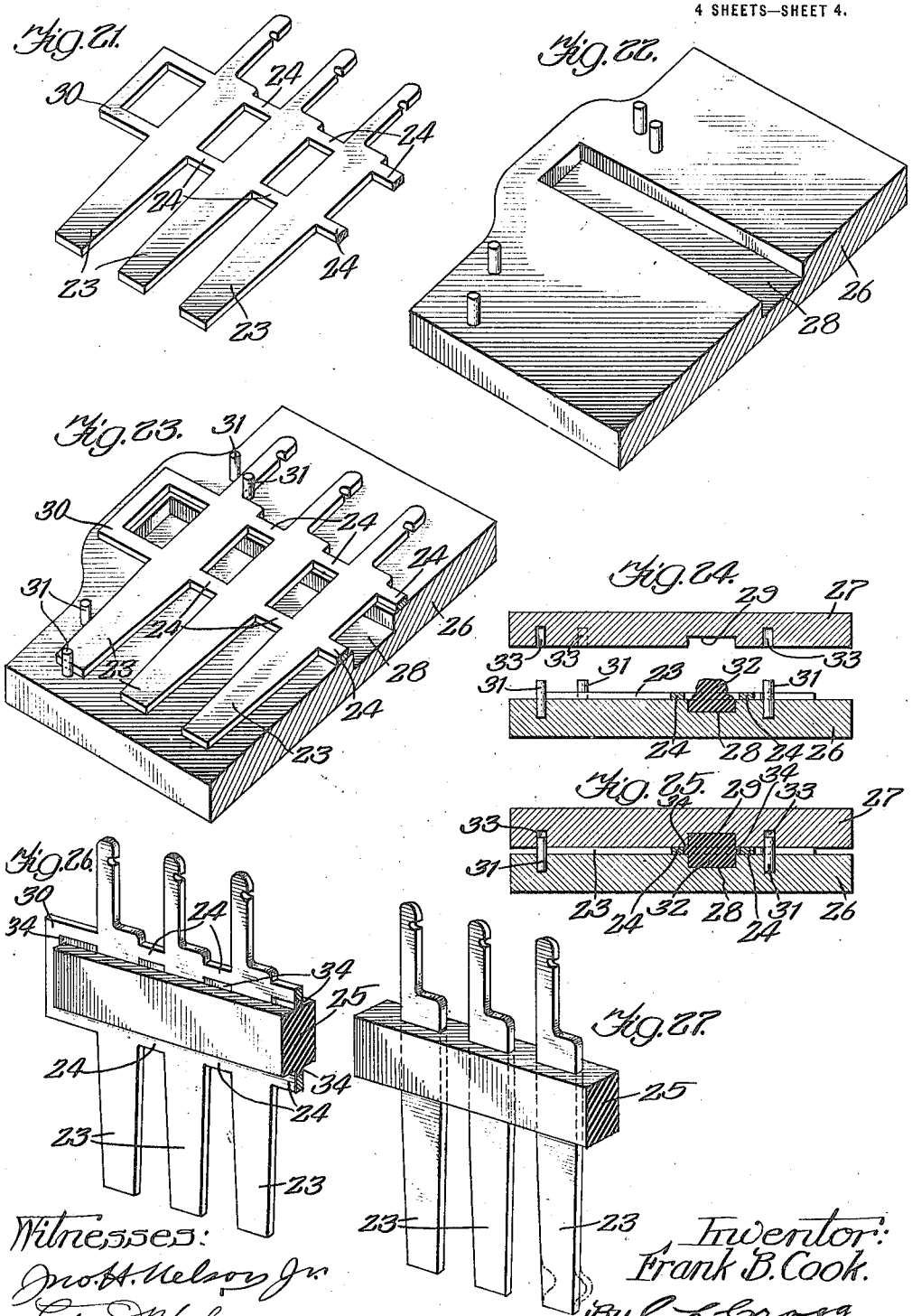
Witnesses:
Inventor:
Frank B. Cook.

UNITED STATES PATENT OFFICE.

FRANK B. COOK, OF CHICAGO, ILLINOIS, ASSIGNOR TO FRANK B. COOK COMPANY, OF CHICAGO, ILLINOIS, A CORPORATION OF ILLINOIS.

PROCESS OF MOUNTING OBJECTS.

1,161,191. Specification of Letters Patent. Patented Nov. 23, 1915.

Application filed June 19, 1914, Serial No. 846,027. Renewed June 18, 1915. Serial No. 34,961.

*To all whom it may concern:*

Be it known that I, FRANK B. COOK, citizen of the United States, residing at Chicago, in the county of Cook and State of Illinois, have invented a certain new and useful Improvement in Processes of Mounting Objects, of which the following is a full, clear, concise, and exact description, reference being had to the accompanying drawings, forming a part of this specification.

My invention relates to the art of mounting a plurality of disconnected objects in a supporting foundation and has a number of objects and characteristics.

The invention has for one of its objects the simplification of the assembly of the objects that are to be mounted within the molding structure; for another of its objects the simplification of the molding structure; and for another of its objects the provision of holding means for the objects to be supported that are to constitute supplemental portions of a molding structure to enable the ready separation of the parts thereof after the molding operation has been completed irrespective of the direction in which the objects to be mounted are disposed within the mold.

The process of my invention, generally speaking, consists in forming objects out of the same piece of material with spaces therebetween, forming object holding portions out of the same piece of material from which said objects are formed, temporarily holding said objects in assembly by said object holding portions, disposing portions of a mounting within the spaces between said objects to engage and permanently maintain said objects in assembly, and removing said object holding portions. The mounting is desirably made of molding material that is formed within the spaces between the objects and about the same.

In the preferred method of practising my invention the holding portions that temporarily assemble the objects are located between the objects and coöperate therewith to surround the spaces inclosed by the objects. In the construction of certain types of apparatus, such as strips of spring jack contacts to be used in the construction of strips of spring jacks, the holding portions that temporarily assemble the objects are in the form of spaced apart webs which take part in limiting the flow of molding material about the spring contacts at the spaces between these webs. After the molding operation is completed these webs are punched or milled away so that the contacts are relieved of direct electrical connection. In the manufacture of other devices, such for example as electromagnetic switches employed in automatic and semi-automatic telephone practice and in which the parts to be mounted are in the form of waiting contacts adapted for engagement by wipers, the holding portions are preferably in the form of chucks which are stamped out of the same strip of material with the contacts, these chucks being first separated from the contacts in the stamping operation and thereafter restored to engagement with the waiting contacts to define the spaces between the contacts in which the molding material is to flow. After the molding operation these chucks are readily displaced whereupon the ends of the contacts are freed for the attachment of wires upon one side of the structure and for the engagement of traveling wipers with the contacts upon the other side of the structure.

I will explain my invention more fully by reference to the accompanying drawings in which—

Figures 1 to 11 inclusive illustrate successive steps that may be followed in practising my invention; Figs. 12 and 13 illustrate some of the die operations that may be employed; Figs. 14 and 15 illustrate steps succeeding those illustrated by Figs. 1 to 13 inclusive; Fig. 16 is a sectional view on line 16—16 of Fig. 15, the molding material being absent; Fig. 17 is a view on line 17—17 of Fig. 14; Figs. 18, 19 and 20 illustrate steps succeeding those illustrated by Figs. 1 to 15 inclusive, Fig. 19 being a sectional view on line 19—19 of Fig. 20; Fig. 21 illustrates a step in a modification of the process illustrated by the prior figures; Fig. 22 illustrates a portion of a molding element that may be employed in the modified process; Figs. 23, 24, 25 and 26 illustrate further steps in the modified process; and Fig. 27 illustrates a part of the product of the modified process.

Like parts are indicated by similar characters of reference throughout the different figures.

The two species of the method of my invention illustrated are adapted each to the formation of a peculiar instrumentality, the specific process illustrated in connection with Figs. 1 to 20 inclusive being of service in the production of a plurality of banks of waiting contacts forming parts of electro-magnetic switches such as switches employed in automatic or semi-automatic telephone practice.

The specific process illustrated by Figs. 21 to 27 inclusive is well adapted to the embodiment of a plurality of spring jack contacts in an assembled row. While the method of the invention is particularly adapted to the production of electric switches or parts thereof it will be apparent, as the invention is fully described, that the invention is not to be limited to any peculiar construction and purpose of the products resulting therefrom.

The invention will first be described more particularly in connection with Figs. 1 to 20 inclusive. Figs. 1 to 13 inclusive illustrate the treatment of a portion 1 of a strip of metal from which contacts are to be stamped and which contacts are to be included in the formation of an electric switch. In the first operation (Fig. 1) a single contact 2 is stamped out of the strip metal 1 by the coöperation of the male and female dies 3 and 4, the punch 5 of the die 3 descending through the strip metal 1 to punch out the waiting contact 2 as clearly illustrated by Fig. 12. In the second operation the plunger 6 (Figs. 12 and 13) is moved upwardly to restore the stamped out waiting contact 2 in the correspondingly shaped opening 7 that was formed in the strip 1 by the punching operation whereby the waiting contact 2 is restored to the plane of the strip metal 1 and is held in position, as clearly indicated in Fig. 2. In the next two operations the waiting contact 8 is stamped out of the strip 1 and is restored to such strip in a manner similar to the operations described in connection with Figs. 1, 2, 12 and 13, these next two operations being illustrated in Figs. 3 and 4. In a similar manner the waiting contact 9 is formed and restored to the strip 1 as illustrated in Figs. 5 and 6, and the last waiting contact 10 is formed and restored to the strip 1 as illustrated in Figs. 7 and 8 by similar steps. The switch member under process of construction happens to include a plurality of sets of waiting contacts, each set having four waiting contacts 2, 8, 9 and 10. Ultimately all of the metal of the strip 1 surrounding and pertaining to the waiting contacts of a set becomes waste but before this surplus material is entirely discarded parts 11 and 12 of it (Figs. 10, 11 and 14 to 18 inclusive) are caused temporarily to enter into the formation of a mold. These portions 11 and 12 are illustrated as being in the form of a pair of waiting contact holding chucks that are stamped out of the strip metal 1 without separating the waiting contacts from the chucks whereby it is not necessary to position the waiting contacts within the chucks by hand, the waiting contacts of a set thus being maintained in their assembly illustrated in Fig. 8. In order to form these chucks the step in the process illustrated by Fig. 9 preferably ensues, the waste material 13 being removed in order to define the spacing intervening between and adjacent the waiting contacts and in which spacing the molding material is to be disposed in the formation of a mounting for the contacts. After this operation, the waste portions 13 having been removed, further waste material 14 is removed in the next step in the process illustrated by Fig. 10, this latter waste material being discarded to produce the structure illustrated in Fig. 11, which figure illustrates a group or set of four waiting contacts held between a pair of chucks with which they are assembled without the necessity of any tedious handling, a result that is due to the restoration of each waiting contact to the strip of metal from which it is stamped, as illustrated by Figs. 2, 4, 6, 8 and 13, and the subsequent formation of the waiting contact holding chucks 11 and 12 from the portions of the strip contiguous to the ends of the waiting contacts and without the separation of the waiting contacts from these strip portions. The assembled waiting contacts 2, 8, 9 and 10 and the chuck 12 are next inserted within a radial groove 15 formed in the lower molding member 16, the slots 15 being separated by radiating ribs 17. Before the molding operation takes place each radial slot 15 is caused to receive a chuck 12 that fills, in conjunction with the waiting contacts held thereby, its slot 15 sufficiently to prevent the material flow of the molding substance into its slot. After the slots 15 have thus been filled by the chucks 12 and the waiting contacts held thereby, a quantity of plastic molding material 18 of any suitable nature and just sufficient to form the required foundation 19 for the waiting contacts is placed within the lower mold 16 as illustrated in Fig. 14. The upper mold member 20 is then brought into engagement with the lower mold member as illustrated in Fig. 15, this upper mold member having radial grooves or slots 21 that are separated by radiating ribs 22 and which slots 21 snugly receive the chucks 11 when the mold members are brought together, the slots 21 and ribs 22 coöperating with the chucks 11 as the slots 15 and ribs 17 coöperate with the chucks 12 to prevent the location of the molding material in the grooves 21. By means of the chucks and the portions 17 and 22 of the mold members that intervene between the same, the molding material is prevented from flowing, at least to any objectionable extent, between these portions or ends of the waiting contacts that are received by said chucks whereby the molding material 18 is limited to flow into the spaces that surround those portions of the waiting contacts that are not received in the chucks and is prevented from flowing to a material extent between the chucks 11 by the ribs 22 and between the chucks 12 by the ribs 17. Thus the ends or portions of the waiting contacts that are received by the chucks 11 and 12 are surrounded only by metal when the mold members have been brought together to shape the plastic molding material into the waiting contact foundation 19, the slots or grooves 15 and 21 being shaped similarly to the chucks 12 and 11 respectively as indicated in Fig. 18. After this foundation has been formed the mold members 16 and 20 are separated from the foundation 19 and the chucks 11 and 12 that previously temporarily formed portions of the molding structure complemental to said mold members, the result of this step being illustrated in Fig. 18. The temporary portions 11 and 12 of the molding structure are next shifted laterally of the planes of the waiting contacts that enter the same in order to effect their separation from such waiting contacts whereby the final product illustrated in Figs. 19 and 20 results. The ends or portions of the waiting contacts that were received in the chucks, having been surrounded by metal in the molding operation, project clear of the contact supporting foundation 19 to enable them to be wired and to adapt them to coöperation with switch wipers, as is well understood by those skilled in the art of electro-magnetic switches that employ waiting contacts and wipers. The lower portions of the waiting contacts slope outwardly so that it would be impossible to employ molding members for molding foundations about the contacts unless the chucks 11 and 12 were employed as parts of the molding members and I therefore claim these chucks that are to constitute parts of the molding structure whether or not such chucks are formed out of the strip material from which the contacts are formed and whether or not such chucks form temporary parts of the molding structure.

While the process of the invention illustrated by Figs. 1 to 20 inclusive is employed in the manufacture of assembled banks of waiting contacts, it is obvious that the invention is not to be limited to the nature of the elements 2, 8, 9 and 10 that are supported by the foundation 19 nor to the material of which said elements and foundation are formed.

I will now describe the embodiment of the invention illustrated by Figs. 21 to 27 inclusive. By means of a suitable mechanism, as for example a punch press including punch and die mechanism, the spring jack contacts 23 are initially stamped from sheet metal in the form illustrated in Figs. 21, 23 and 26 where as many springs 23 as there are to be spring jacks in the strip of spring jacks are stamped out of the same piece of strip metal, such springs being connected by webs 24 in order that the springs may be maintained in assembled relation to facilitate their disposal within the mold structure and which webs are to restrict the flow of molding material that is to be molded around the springs, the webs then constituting temporary portions of the molding structure. The final product is illustrated in Fig. 27 wherein the spring jack springs 23 are illustrated as being mounted in the foundation strip 25 of insulating material, the webs 24 being removed in the final step of the process to complete the product. The mold members 26 and 27 are provided with grooves or recesses 28 and 29 which conform to the shape of the major portion of the support 25 when the mold members are assembled, it being understood that portions only of the mold members and foundation strip are illustrated since many more spring jacks than three are usually included in a strip of spring jacks, it being stated that the right hand ends of the structures illustrated in Figs. 21, 22, 23, 26 and 27 are similar to the illustrated left hand ends thereof. The molding material receiving recess or space partially established by the grooves 28 and 29 when in register is completed by the webs 24 and a loop 30 temporarily integral with each end spring 23. The webs, springs and loops should preferably be formed in one operation. After the strip of assembled springs 23 with the end loops 30 have been formed it is placed upon the lower die member 26 in the position indicated in Fig. 23, the pins 31 projecting upwardly from the die member 26 serving to define the location of said strip of springs. After the step illustrated by Fig. 23 has been taken, plastic molding insulating material 32 (Fig. 24) is placed within the space partially defined by the groove 28, the webs 24 and loops 30, this molding material being in sufficient amount to form the foundation strip 25 when the molding operation has been completed. After the described location of the molding material 32, the upper mold member is lowered upon the lower mold member in a manner to bring the pins 31 within the pin holes 33, these pins and pin holes serving to guide the upper mold member in its movement toward the other. Sufficient pressure is exerted upon the upper mold member to cause the plastic material 32 to fill the entire space defined by the grooves 28 and 29, the webs 24, and the loops 30. After this operation has been concluded the mold members are separated and the initial product, partially illustrated by Fig. 26, is removed. After the removal of this initial product the webs 24 and the loops 30 are punched off so as to produce the final product in which the contact springs 23 are electrically distinct in so far as their immediate relationship is concerned. A plurality of rows of spring contacts of suitable formation, mounted in accordance with the method of my invention, may be assembled to form spring jacks and the plug engaging ends of these springs may readily be kinked after the product has been produced and as indicated by dotted lines in connection with one of the springs 23 in Fig. 27. It will be observed that the webs 24 and loops 30 recede from the edges of the grooves 28 and 29. This is for the purpose of preventing any portion of the webs 24 and loops 30 from projecting within the space of the grooves 28 and 29. The small fins 34 which are formed due to this precaution may readily be punched off when the webs 24 and loops 30 are punched off so that the foundation strip 25 will present the final appearance illustrated in Fig. 27.

The extreme simplicity of the molding structure that includes the mold members 26 and 27 is apparent. It is also apparent that the flow of molding material beyond the prescribed space is absolutely prevented irrespective of those slight variations in thickness of the metal of which the springs 23 are made that occurs in actual manufacture, it being clearly seen, particularly by reference to Fig. 25, that the only limitation to the approach of the die members 26 and 27 is the thickness of the strip metal of which the spring contacts are made.

While I have herein shown and particularly described the preferred manner of practising my invention and useful products of the method of my invention and the preferred mechanism whereby the invention may be practised, I do not wish to be limited to the precise details set forth, but

Having thus described my invention I claim as new and desire to secure by Letters Patent the following:—

1. The process of mounting a plurality of objects which consists in forming said objects out of the same piece of material with spaces therebetween; forming object holding portions out of the same piece of material from which said objects are formed; temporarily holding said objects in assembly by said object holding portions; forming molding material in the spaces between said objects to engage and permanently maintain said objects in assembly; and removing said object holding portions.

2. The process of mounting a plurality of objects which consists in forming said objects out of the same piece of material with spaces therebetween; forming object holding portions out of the same piece of material from which said objects are formed; locating said object holding portions between said objects and temporarily holding said objects in assembly thereby; forming molding material in the spaces between said objects to engage and permanently maintain said objects in assembly; and removing said object holding portions.

3. The process of mounting a plurality of objects formed of strip material which consists in stamping said objects and portions for holding said objects in assembly out of the same piece of strip material with spaces between said objects; temporarily holding said objects in assembly by said object holding portions; forming molding material in the spaces between said objects to engage and permanently maintain said objects in assembly; and removing said object holding portions.

4. The process of mounting a plurality of objects formed of strip material which consists in stamping said objects and portions for holding said objects in assembly out of the same piece of strip material with spaces between said objects; locating said object holding portions between said objects and temporarily holding said objects in assembly thereby; forming molding material in the spaces between said objects to engage and permanently maintain said objects in assembly; and removing said object holding portions.

5. The process of mounting a plurality of objects formed of strip material which consists in stamping said objects and portions for holding said objects in assembly out of the same piece of strip material with spaces between said objects; separating said objects from said object holding portions; restoring said object holding portions to holding engagement with said spaced apart objects; temporarily holding said objects in assembly by said object holding portions; forming molding material in the spaces between said objects to engage and permanently maintain said objects in assembly; and removing said object holding portions.

6. The process of mounting a plurality of objects formed of strip material which consists in stamping said objects and portions for holding said objects in assembly out of the same piece of strip material with spaces between said objects and with said object holding portions located in the spaces between said objects; separating said objects from said object holding portions; restoring said object holding portions to holding engagement with said spaced apart objects; temporarily holding said objects in assembly by said object holding portions; forming molding material in the spaces between said objects to engage and permanently maintain said objects in assembly; and removing said object holding portions.

7. The process of mounting a plurality of objects formed of strip material which consists in stamping said objects and portions for holding said objects in assembly out of the same piece of strip material with spaces between said objects and with said object holding portions spaced apart to serve with the objects that they unite to surround the spaces between the objects; forming molding material in the spaces between said objects to engage and permanently maintain said objects in assembly; and removing said object holding portions.

8. The process of mounting a plurality of objects formed of strip material which consists in stamping said objects and portions for holding said objects in assembly out of the same piece of strip material with spaces between said objects and with said object holding portions spaced apart to serve with the objects that they unite to surround the spaces between the objects; separating said objects from said object holding portions; restoring said object holding portions to holding engagement with said spaced apart objects; forming molding material in the spaces between said objects to engage and permanently maintain said objects in assembly; and removing said object holding portions.

9. The process of mounting a plurality of objects formed of strip material which consists in stamping said objects and portions for holding said objects in assembly out of the same piece of strip material with spaces between said objects and with said object holding portions located in the spaces between said objects and spaced apart to serve with the objects that they unite to surround the spaces between the objects; forming molding material in the spaces between said objects to engage and permanently maintain said objects in assembly; and removing said object holding portions.

10. The process of mounting a plurality of objects formed of strip material which consists in stamping said objects and portions for holding said objects in assembly out of the same piece of strip material with spaces between said objects and with said object holding portions located in the spaces between said objects and spaced apart to serve with the objects that they unite to surround the spaces between the objects; separating said objects from said object holding portions; restoring said object holding portions to holding engagement with said spaced apart objects; forming molding material in the spaces between said objects to engage and permanently maintain said objects in assembly; and removing said object holding portions.

11. The process of mounting a plurality of objects which consists in forming the objects out of the same piece of material with portions of such material retained to hold the objects in assembly; forming molding material in holding relation to said objects; and removing the object holding portions of the material out of which the objects are made.

12. The process of mounting a plurality of objects which consists in forming the objects out of the same piece of material; removing portions of the material joining these objects and restoring the same into holding relation with the objects; forming molding material in holding relation to said objects; and removing the object holding portions of the material.

In witness whereof, I hereunto subscribe my name this 16th day of June A. D., 1914.

FRANK B. COOK.

Witnesses:
G. L. CRAGG,
ETTA L. WHITE.